US009223851B2

(12) United States Patent
Zarzar Charur et al.

(10) Patent No.: US 9,223,851 B2
(45) Date of Patent: *Dec. 29, 2015

(54) RECOMMENDING QUERIES WHEN SEARCHING AGAINST KEYWORDS

(75) Inventors: Daniel G. Zarzar Charur, Redmond, WA (US); Mark D. Huentelman, Bellevue, WA (US); Noaa Avital, Bellevue, WA (US); Jun Ge, Bellevue, WA (US); Joel W. Varland, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,889

(22) Filed: Jan. 5, 2011

(65) Prior Publication Data

US 2011/0106831 A1 May 5, 2011

Related U.S. Application Data

(63) Continuation of application No. 12/130,629, filed on May 30, 2008, now Pat. No. 7,890,516.

(51) Int. Cl.
*G06F 7/00* (2006.01)
*G06F 17/30* (2006.01)

(52) U.S. Cl.
CPC .................................. *G06F 17/3064* (2013.01)

(58) Field of Classification Search
CPC .................... G06F 17/30386; G06F 17/30861; G06F 17/30864; G06F 17/30943
USPC .................................................. 707/706, 736
See application file for complete search history.

(56) References Cited

U.S. PATENT DOCUMENTS

| 5,495,606 | A | * | 2/1996 | Borden et al. ......................... 1/1 |
| 6,006,225 | A | * | 12/1999 | Bowman et al. ...................... 1/1 |
| 6,098,081 | A | * | 8/2000 | Heidorn et al. ................ 715/200 |
| 6,169,986 | B1 | * | 1/2001 | Bowman et al. ...................... 1/1 |
| 6,279,018 | B1 | * | 8/2001 | Kudrolli et al. ................ 715/234 |
| 6,327,593 | B1 | * | 12/2001 | Goiffon ................................ 1/1 |
| 6,484,162 | B1 | * | 11/2002 | Edlund et al. ......................... 1/1 |
| 6,571,295 | B1 | * | 5/2003 | Sidana ........................... 709/246 |
| 6,581,056 | B1 | * | 6/2003 | Rao ...................................... 1/1 |

(Continued)

OTHER PUBLICATIONS

Ilyas et al., "A Survey of Top-k Query Processing Techniques in Relational Database Systems"; ACM 2008.*

(Continued)

*Primary Examiner* — Daniel Kuddus
(74) *Attorney, Agent, or Firm* — Steve Crocker; Tom Wong; Micky Minhas

(57) ABSTRACT

A query including one or more current search terms is received from a user and executed against a target database. When the query yields a number of results less than a defined search threshold (a.k.a. an "unsuccessful" search), the current search terms are compared with an associations database. The associations database includes associations between search terms in previously-executed queries that yielded less than a threshold number of results and replacement search terms that were substituted to generate a successful query yielding at least the threshold number of results. Upon finding a match between one or more of the search terms and the current search terms, the associations between the search terms and the replacement search terms are used to identify suggested replacement search terms and present them to the user.

20 Claims, 11 Drawing Sheets

(56) References Cited

U.S. PATENT DOCUMENTS

| | | | |
|---|---|---|---|
| 6,601,026 B2* | 7/2003 | Appelt et al. | 704/9 |
| 6,633,873 B1* | 10/2003 | Nakamura | 1/1 |
| 6,701,309 B1* | 3/2004 | Beeferman et al. | 1/1 |
| 6,772,150 B1* | 8/2004 | Whitman et al. | 707/721 |
| 6,970,859 B1 | 11/2005 | Brechner et al. | 707/3 |
| 6,983,270 B2* | 1/2006 | Rippich | 1/1 |
| 7,305,401 B2* | 12/2007 | Keith, Jr. | 1/1 |
| 7,735,065 B2* | 6/2010 | Jain et al. | 717/125 |
| 7,756,855 B2* | 7/2010 | Ismalon | 707/713 |
| 7,912,842 B1* | 3/2011 | Bayliss | 707/749 |
| 2001/0047355 A1* | 11/2001 | Anwar | 707/5 |
| 2004/0215643 A1 | 10/2004 | Brechner et al. | 707/100 |
| 2004/0254920 A1 | 12/2004 | Brill et al. | 707/3 |
| 2005/0149499 A1* | 7/2005 | Franz et al. | 707/3 |
| 2005/0182783 A1 | 8/2005 | Vadai et al. | 707/102 |
| 2006/0026147 A1* | 2/2006 | Cone et al. | 707/3 |
| 2006/0161520 A1 | 7/2006 | Brewer et al. | 707/3 |
| 2006/0224579 A1 | 10/2006 | Zheng | 707/5 |
| 2007/0016545 A1 | 1/2007 | Broder et al. | 707/1 |
| 2007/0050351 A1* | 3/2007 | Kasperski et al. | 707/4 |
| 2007/0061303 A1* | 3/2007 | Ramer et al. | 707/3 |
| 2007/0061317 A1* | 3/2007 | Ramer et al. | 707/4 |
| 2007/0061334 A1* | 3/2007 | Ramer et al. | 707/10 |
| 2007/0061335 A1* | 3/2007 | Ramer et al. | 707/10 |
| 2007/0100650 A1* | 5/2007 | Ramer et al. | 705/1 |
| 2007/0174238 A1* | 7/2007 | Sareen et al. | 707/3 |
| 2008/0255921 A1* | 10/2008 | Flake et al. | 705/10 |
| 2009/0029687 A1* | 1/2009 | Ramer et al. | 455/414.3 |
| 2009/0299991 A1 | 12/2009 | Zarzar Charur | 707/3 |

OTHER PUBLICATIONS

Chien, S., et al.; "*Semantic Similarity between Search Engine Queries Using Temporal Correlation*"; http://www2005.org/cdrom/docs/p2.pdf; May 10-14, 2005; pp. 2-11.

Zhang, Z., et al.; "*Mining Search Engine Query Logs for Query Recommendation*"; http://www2006.org/programme/files/pdf/p214.pdf; May 22-26, 2006; 2 Pgs.

Nambiar, U., et al.; "*GEONSearch: From Searching to Recommending*"; http://www.geongrid.org/geoinformatics2006/abstracts/20060315113441-ubnambiarATcs.ucdavis.edu__Abstract2.pdf; 1 Pg.

Taghva, K., et al.; "*The Role of Manually-Assigned Keywords in Query Expansion*"; http://www.isri.unlv.edu/publications/isripub/Taghva2003e.pdf; pp. 1-32.

\* cited by examiner

RECOMMENDING QUERIES WHEN SEARCHING AGAINST KEYWORDS

RELATED APPLICATIONS

This application is a continuation of and claims priority to application Ser. No. 12/130,629, filed May 30, 2008 now U.S. Pat. No. 7,980,516, entitled RECOMMENDING QUERIES WHEN SEARCHING AGAINST KEYWORDS, which is hereby incorporated by reference.

BACKGROUND

A continuing challenge in keyword searches is that when a user searches using keywords that do not correspond with the words used in indexing desired results, the keyword search will be unsuccessful. The problem may be particularly acute when a desired non-textual result, such as an image stored in a clip art library, is indexed using a single name or limited set of words. In such a situation, unless the user identifies the same word or words that the database administrators used in indexing the desired result, the user may struggle in retrieving one or more desired entries.

Most users of textual search engines, upon failing to secure one or more desired results in an initial search, will attempt to refine the search terms they use in their queries until they retrieve satisfactory results. However, after repeated efforts to modify their search terms to secure desired results, even skilled and patient users may become frustrated and give up trying to find that for which they searched. Creators and administrators of databases certainly do not want to frustrate their users or have the users quit using the databases without finding the results they desire. Quite to the contrary, whether the databases charge for their use, are supported by advertisements, or are used to secure good will with users, the proprietors of databases want to make their databases easy to use to attract more and more users to their service.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A query including one or more current search terms is received from a user and executed against a target database. When the query yields a number of results less than a current search threshold, the current search terms are compared with an associations database. The associations database includes associations between search terms in previously-executed queries that yielded less than a threshold number of results and replacement search terms that generate a successful query (yielding at least the threshold number of results). Upon finding a match between the current search terms and the previously-executed search terms in the associations database, the associations database is used to identify suggested replacement search terms and present them to the user.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements.

DETAILED DESCRIPTION OF IMPLEMENTATIONS

Figure 1:
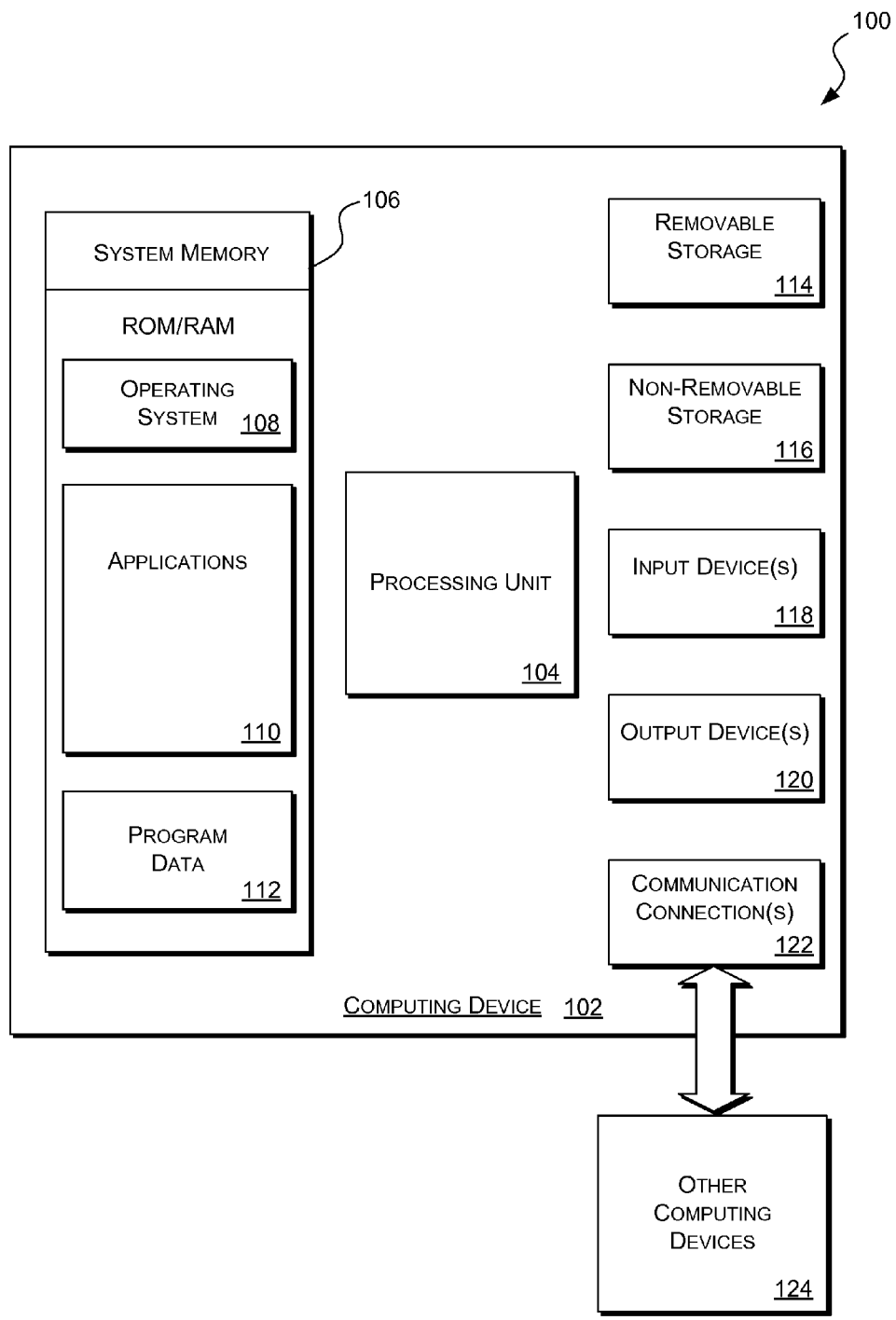
FIG. 1 is a block diagram of an operating environment supporting implementations of methods and computer-readable media as herein described.

This detailed description describes implementations of recommending queries to users searching a database when a query has not returned a satisfactory number of responses, particularly when the database is indexed according to keywords. The detailed description also describes implementations of developing an associations database to facilitate the recommendation of queries and search terms based upon previously-executed queries, the results of the previously-executed queries, and/or subsequent queries following what may have been unsuccessful, previously-executed queries.

By way of overview, when a user performs a query against a database in which the information stored in the database is organized according to keywords, generally the user will have to correctly submit one or more of the keywords used to index entries in the database to retrieve the desired results. If a user enters a query that doesn't produce the desired results, generally, the user will modify the query to include different, replacement search terms in a further attempt to retrieve the desired results. Unfortunately, the user may not think to use the same terms used in the keywords indexing the database, even after repeated search attempts. Such a user may become frustrated with the database to the extent that he or she will not use the database again and/or may not recommend the database to others.

Implementations according to the present disclosure use an associations database to help users to modify the search terms used in their queries to secure the desired results. The associations database associates search terms in queries that did not yield desired results (in terms of number of returned results) with search terms used in subsequent, modified searches that did yield at least a desirable number of results. The associations database thus maps the terms used in unsuccessful, previously-executed queries with replacement search terms used in subsequent successful queries.

In one implementation, the associations database is created by identifying previously executed searches that retrieved less than a threshold number of results, for example, queries that retrieved zero results. Subsequently entered queries secured desired results or desired numbers of results are tracked. The terms in the one or more unsuccessful, previously-executed searches are mapped to the replacement terms included in successful queries. Implementations of the present disclosure contemplate mapping the searches as including both automatic and manual processes. For example, searches that return less than a threshold number of results (e.g., no results) may be automatically identified by the search engine. In addition, follow-up searches to these identified searches and the results that each retrieves may be logged automatically. On the other hand, for example, incorporation of the previously-executed searches and to what is considered to be a successful, subsequent search may be performed manually. In addition, to prevent the associations database from suggesting objectionable or offensive phrases, the associations database may be scrubbed automatically or manually to locate and remove such terms.

Illustrative Operating Environments

Implementations of computer-implemented methods, computer-readable media, and systems of the present disclosure may be supported by a variety of computing devices. The computing devices may include client workstations from which and on which queries are entered and processed, client workstations that receive the queries and pass them to one or more client servers to execute the searches, and other computing environments.

FIG. 1 is a block diagram of a representative operating environment 100 operable to support computer-implemented methods and user-interfaces as herein described. The operating environment is representative of both a client computing system operable to run a locally-executing software program and a server that exchanges information with the client computing system.

Referring to FIG. 1, an exemplary operating environment 100 includes a computing device 102. In a basic configuration, the computing device 102 may include any of a number of forms of stationary or mobile computing devices. The computing device 102 typically includes at least one processing unit 104 and a system memory 106. Depending on the exact configuration and type of computing device, the system memory 106 may be volatile (such as RAM), non-volatile (such as ROM, flash memory, and the like) or some combination of the two. The system memory 106 typically maintains an operating system 108, one or more applications 110, and program data 112.

The computing device 102 may also have additional features or functionality. For example, the computing device 102 may also include additional data storage devices (removable and/or non-removable) such as, for example, magnetic disks, optical disks, nonvolatile memory storage, and other types of storage devices. Such additional storage is illustrated in FIG. 1 by removable storage 114 and non-removable storage 116. Computer storage media may include volatile and non-volatile, removable and non-removable media implemented in any method or technology for storage of information, such as computer readable instructions, data structures, program modules or other data. The system memory 106, the removable storage 114, and the non-removable storage 116 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 102. Any such computer storage media may be part of the computing device 102. The computing device 102 may also have input device(s) 118 such as a keyboard, mouse, pen, voice input device, touch input device, etc. Output device(s) 120 such as a display, speakers, printer, etc., may also be included.

The computing device 102 also may include one or more communication connections 122 that allow the computing device 102 to communicate with other computing devices 124, such as over a network or a wireless network. The one or more communication connections 122 are an example of communication media. Available forms of communication media typically carry computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 2:
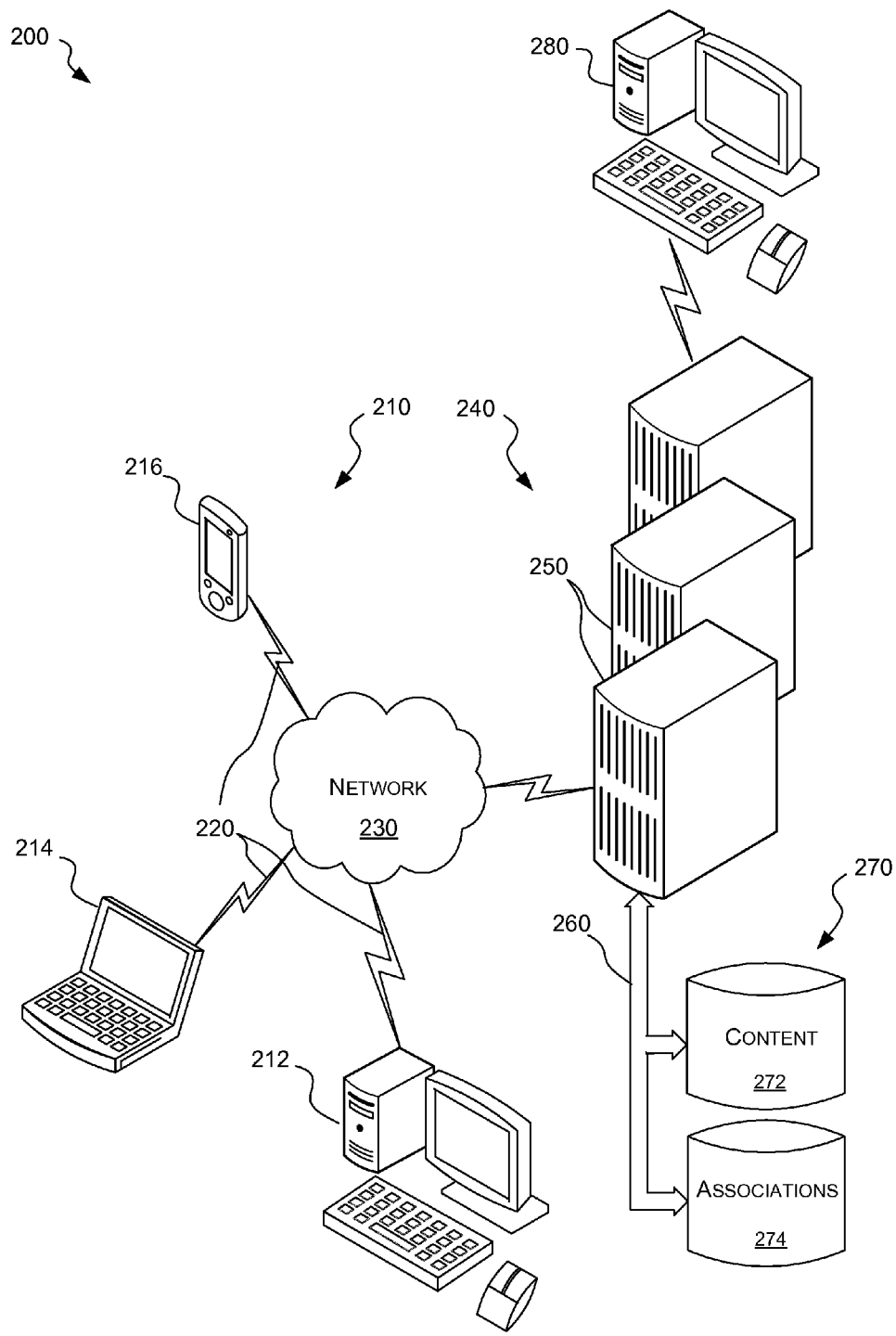
FIG. 2 is a block diagram of network supporting implementations of computer-implemented methods as herein described.

FIG. 2 is a block diagram of a representative operating environment 200 in which one or more client computing systems initiate queries that are presented to one or more servers over a network. In a client environment 210, client systems, such as desktop computing systems 212, portable computing systems 214 such as laptop and notebook computers, and handheld devices 216 such as personal digital assistants or smart phones, access wired or wireless network connections 220 to participate in a network 230. The network 230 facilitates communication between the client environment 210 and a server environment 240. The server environment 240 includes one or more server computing systems 250 that communicate over a bus or channel 260 with one or more storage devices 270. As further described below, the storage devices 260 support at least two databases including a content database 272 storing the content sought by the users in the client environment 210 and an associations database 274 to recommend queries to users as further described below. The server environment 240 also includes one or more administrator workstations 280 that can be used to manage the server environment 240 as well as to help develop and manage the associations database 274 as also further described below.

According to implementations of the present disclosure, queries can be initiated and performed on a client workstation. The client workstations may include a desired content database and receive an associations database to assist the user in finding desired content. Alternatively, the client workstations may receive queries from a user and pass them over a network to a server system that processes the queries to retrieve desired content and/or access the associations database to communicate recommended queries over the network to users of the client workstations. Further alternatively, in a distributed function, network environment, some content may be maintained and queries performed with support from an associations database on a client workstation while additional content and associations database information may be accessed on a server over a network as desired or needed. Implementations of the present disclosure include any such combinations and permutations of workstation, network, and server configurations.

Developing Associations to Successful Queries

Generally speaking, implementations of the present disclosure developed associations between previously-executed, "unsuccessful" queries and subsequent "successful" queries to build an associations database from which recommendations may be made to users who perform "unsuccessful" queries. In this context, queries may be regarded as "successful" or "unsuccessful" based on a quantitative measurement as to whether a query retrieves at least a threshold number of results, such as one or more results, rather than being based on a qualitative evaluation. In other words, when previously-executed queries fail to return a satisfactory number of results, but subsequent modified searches using one or more replacement search terms do yield sufficient results, the search terms in the previously-executed queries are mapped to recommended replacement terms that led to the sufficient results. Then, when users later execute queries including the same search terms as the unsatisfactory searches, the replacement terms from the subsequent searches may be recommended to the users to assist the users is retrieving the desired results.

For purposes of the following description of implementations of the present disclosure, the content being searched is a clip art or images database in which the images each are associated with one or more keyword identifiers to allow the images to be searched using keywords. Implementations of the present disclosure are not restricted to clip art or image databases. Implementations of the present disclosure may applied to any content in which a list of associations between search terms of previously-executed queries and replacement search terms from more fruitful queries may be associated. Developing a database of such associations will be simpler for a content database employing fewer keywords because, logically, there are fewer possible associations to identify and manage than for a database including a larger number of keywords.

More specifically, for purposes of the following description, it is assumed that one or more users have previously executed queries against a content database of clip art seeking an image of a wireless router, for example, to include in a network diagram. It is assumed that three different series of previously-executed queries were submitted, none of which achieved successful results in one or more first attempts, but that the user eventually identified the terms "wireless router" to retrieve the desired results. Subsequently, a user seeking the clip art image of the wireless router submits a query using the same search terms that failed to retrieve the desired results using one or more of the same search terms used in the previously-executed queries. However, according to an implementation of the present disclosure, an associations database mapping the search terms included in the previously-executed unsuccessful queries is used to recommend replacement search terms to assist this subsequent user in securing the desired results.

Figure 3:
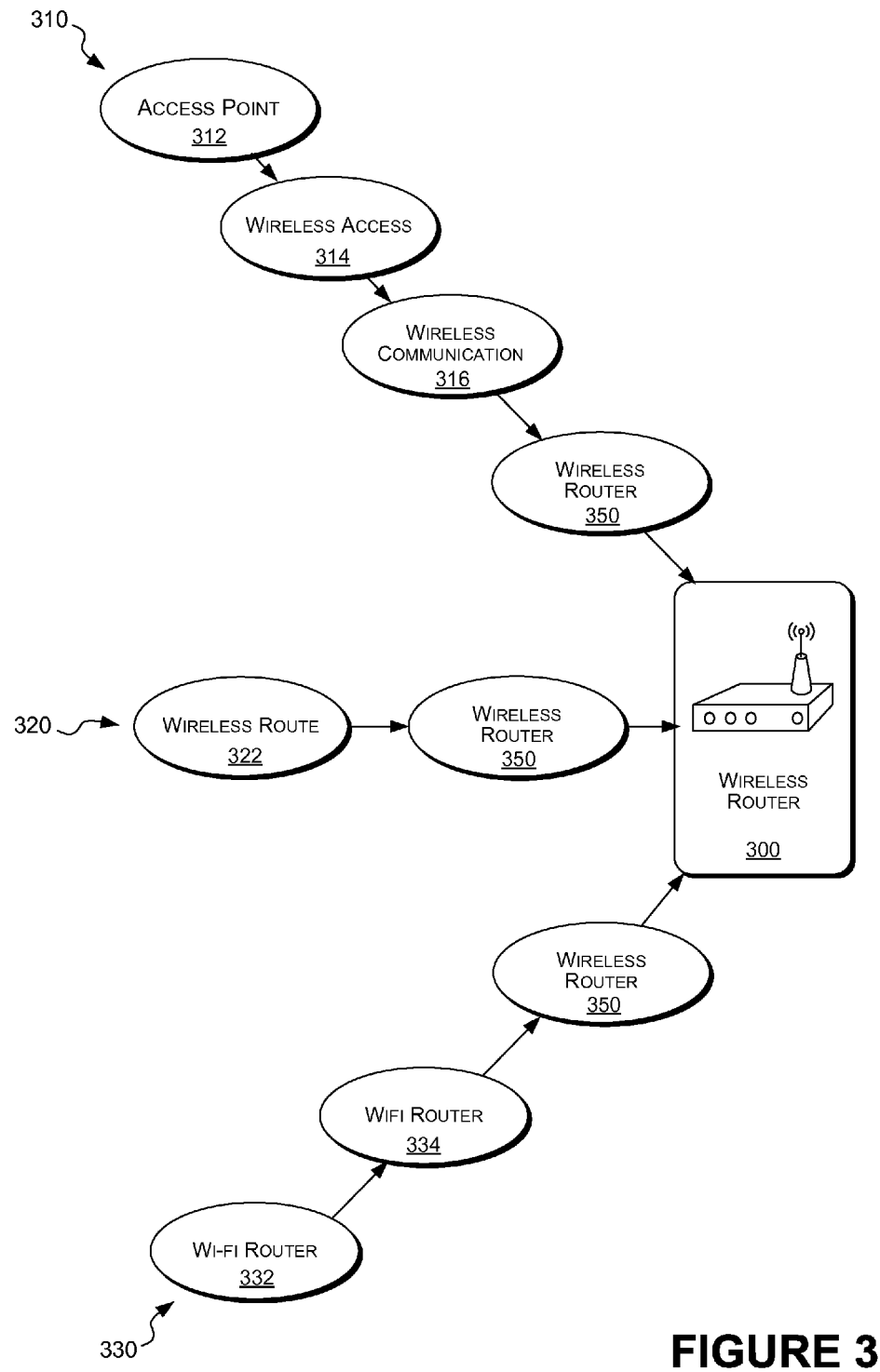
FIG. 3 is a block diagram of a hypothetical plurality of queries seeking a particular result that failed to retrieve a threshold number of results.

FIG. 3 is a block diagram representing a plurality of previously-executed, unsuccessful searches of a content database consisting of clip art images in which the user or users sought a clip art image indexed as a "wireless router" 300. FIG. 3 includes three series of queries 310, 320, and 330 in which the initial query failed to yield a threshold number of results. Each of the nodes in each of the series of queries 310, 320, and 330 represents a consecutive query submitted by the same user in seeking the desired image of the "wireless router" 300. For purposes of this example, it is assumed that the threshold number of results that lead to a query being labeled as successful is one result; thus, previously-executed queries that retrieved zero results are identified as unsuccessful searches used in building an associations database.

In a first series of queries 310, a user seeks the desired image 300 by entering a first query 312 using the search terms "access point." Unfortunately for the user, while the developers of the clip art content database may have indexed the desired image 300 of the keywords "access point" instead of or in addition to indexing the desired image 300 as a "wireless router," the first query 312 retrieves no results. Failing in the first attempt, the user modifies the query and submits a second query 314 using the search terms "wireless access." Again, the query 314 retrieves no results. Undaunted, the user enters a next set of search terms "wireless communication" in a third query 316 but again retrieves no results. Finally, in a successful query 350 that retrieves at least one result, the user enters the search terms "wireless router," retrieving the desired image 300.

In a second series of queries 320, a user seeks the desired image 300 by entering a first query 322 using the search terms "wireless route." The user may have meant to type "wireless router," and simply mistyped the query. Nonetheless, the first query retrieves no results, leading the user to enter the successful query 350 including the search terms "wireless router."

In a third series of queries 330, a user seeks the desired image 300 by entering a first query 332 using the search terms "wi-fi router." Failing to retrieve any desired results, the user may assume that the first query 332 included a misspelling and then enters a second query 334 using "wifi router." Upon again failing to retrieve a desired result, on the third query the user enters the successful query 350 "wireless router."

According to implementations of the present disclosure, it would be desirable to save the users submitting the first series of queries 310 and the third series of queries 330 the time, effort, and/or frustration of having to work through the series of queries involved in retrieving the desired result. In addition, the user entering the second series of queries 320 only submitted on unsuccessful query 322, but having submitted a query 322 of "wireless route" that was only one letter away from the successful query 350, it is possible that user may be taken a different approach and proceeded to enter a series of queries further removed from the successful query 350. Also, while in these examples the users entered no more than three unsuccessful queries, users may enter large numbers of queries before retrieving desired results.

Figure 4:
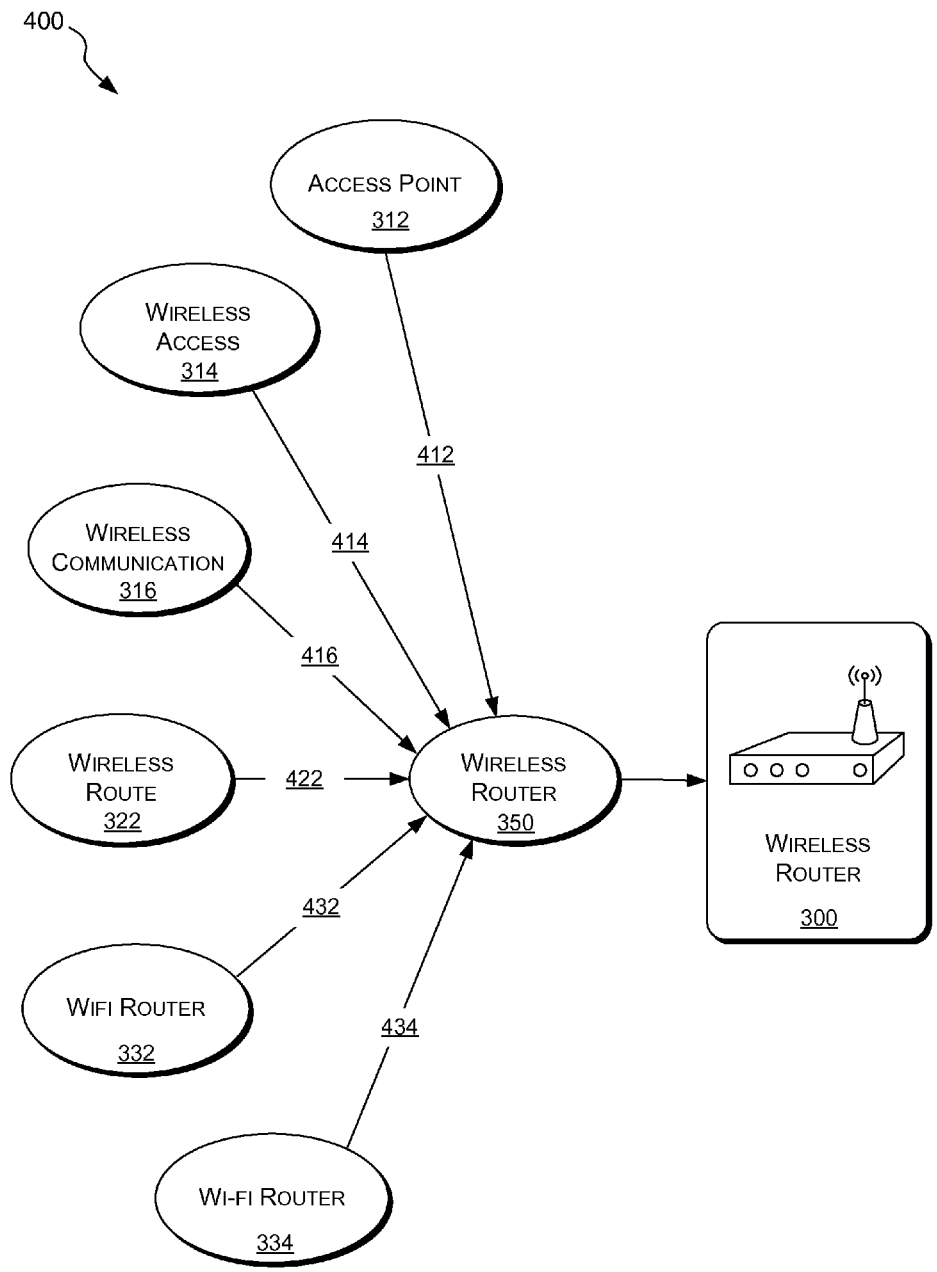
FIG. 4 is a block diagram of the hypothetical plurality of queries of FIG. 3 to create associations with replacement search terms that will yield a threshold number of results.

FIG. 4 shows a plurality of mappings 400 of the unsuccessful queries of FIG. 3 being mapped to the successful query 350 "wireless router." Again, according to implementations of the present disclosure, queries that are unsuccessful are those that retrieve less than a threshold number of results (e.g., a query that retrieves zero results is unsuccessful if the threshold is one or more results). Implementations of the present disclosure map these queries to one or more successful queries (e.g., subsequent queries in FIG. 3 that retrieve at least one result). FIG. 4 is just one plurality of associations that may be included in an associations database that may include any number of associations or sets of associations.

Implementations of the present disclosure may automatically and/or manually identify unsuccessful queries and mappings to successful queries. For example, in an automatic process, any query that retrieves less than the threshold number of queries may be identified as an unsuccessful query, then all additional queries in the series of queries that do not retrieve the threshold number of results will automatically be mapped to one or more subsequent queries that do retrieve at least the threshold number of results. It should be noted that just because one query retrieves the threshold number of results, a user may continue to submit queries seeking a different result. Thus, one unsuccessful query may be mapped to multiple successful queries of replacement search terms that may be suggested to a user as described further below.

Additional automatic processes included in implementations of the present disclosure may search and delete any queries containing objectionable terms or phrases, such as terms or phrases that are obscene or otherwise offensive. Also, once an associations database is created, the number of associations may be trimmed by including only query pairings that have been received at least a predetermined minimum number of times. In this way, unsuccessful/successful query pairs that have shown some likelihood of being repeated are included in the associations database while random or spurious queries are not included that might only increase the size of the associations database.

It should be noted that removing queries that were not received more than a minimum number of times may effectively eliminate undesirable mappings in which a user entered an unsuccessful query for one item then changed his or her mind and eventually submitted a successful search for an entirely different item. Including one or more associations for the initial, failed query to an unrelated but successful query may lead to confusion in using the associations database, thus, such queries are desirably omitted from the associations database.

Further alternatively the creations of the associations database may include an entirely manual process, creating associations either from previously-entered but unsuccessful queries or from hypothetical queries that the administrators of the content database may foresee being entered. Also, for example, the process of eliminating seemingly spurious unsuccessful queries or offensive terminology may be or may include a manual process.

Referring again to FIG. 4, the plurality of associations can be considered as a subset of an associations database. Automatically and/or manually, each of the queries included in the series of queries 310, 320, and 330 (FIG. 3) are mapped to or associated with the successful query 350 specifying the search terms "wireless router." Thus, in implementations of the present disclosure using an associations database, when a user enters any one of the unsuccessful queries 312-316, 322, and 332-334, mappings 412-416, 422, and 432-434, respectively, will be retrieved from the associations database to recommend to the user the replacement search terms "wireless router" included in the successful query 350. In other words, upon entering one of the unsuccessful queries, the user could be asked "did you mean to submit the query 'wireless router'?" as described further below.

Had such an associations database been available, the users entering the first series of queries 310 and the third series of queries 330 would have been saved one or more subsequent unsuccessful searches before entering the successful query 350 that secured the desired result. The user submitting the second series of queries 320, who may simply have miskeyed the desired query and not recognized that fact, may have been saved from trying a more remote line of queries. In addition, in implementations of the present disclosure using a menu-driven or graphical user interface, if the associations database presents what appears to be desirable replacement search terms, the user can simply select the replacement search terms to submit the next query rather than having to enter or re-enter the replacement search terms.

Recommending Queries to Users

Implementations of the present disclosure operate in accordance with a search engine for a content database or other system that receives queries or searches. When a user enters a successful query that retrieves a number of results at least equal to a current threshold set for identifying a successful query, the user will be presented with the items retrieved in response to the query and the associations database will not be consulted on behalf of the user. On the other hand, when a user enters a query that does not retrieve a number of results at least equal to the current threshold (e.g., such as zero results if the current threshold is set to one or more), the user's query is compared to the associations database to determine if there are associations for that query that may be used to recommend replacement search terms to the user.

In implementations of the present disclosure, the threshold used in identifying unsuccessful queries described with reference to FIGS. 3-4 and the current threshold used in determining whether to access the associations database may be the same or different. For example, in developing the associations database, the threshold for identifying unsuccessful searches may be set to two or more results while the current threshold for determining whether to access the associations database may be set to one or more.

FIGS. 5-9 present a series of screen views of a search engine or query facility employing implementations of the present disclosure. In each case, it is assumed that the user has entered an unsuccessful search. As previously mentioned, when a user enters a successful query, the associations database is bypassed and the retrieved results are presented to the user. In FIGS. 5-9, it is again assumed that a user is searching a clip art content database for an image of a "wireless router."

Figure 5:
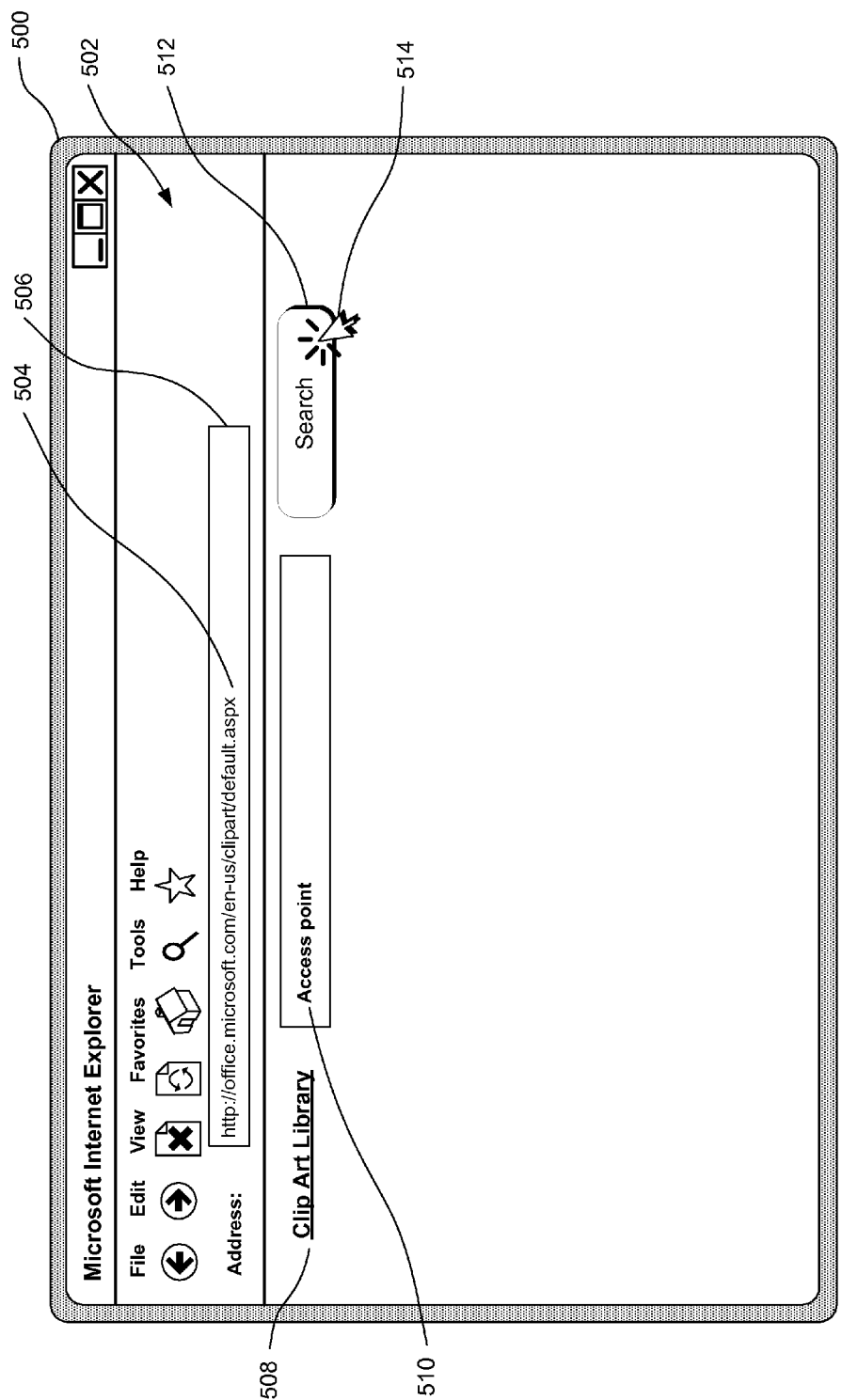
FIGS. 5-7 are screen views of an application configured to receive a query from a user and, upon failing to retrieve a threshold number of results, recommending replacement search terms selectable by a user to generate a successful query.

FIG. 5 is a screen view 500 of a query entry screen that a user may access to search for clip art images. The screen view 500 is of a browser application 502, such as Microsoft Internet Explorer® produced by Microsoft Corporation for browsing locations on a local computer or accessing a service over a network. In the present example, the browser application 502 is used to access a web-based clip art database as indicated by the uniform resource locator (URL) "http://office-.microsoft.com/en-us/clipart/default.aspx" 504 entered in the address field 506 of the browser application 502. The URL 504 accesses an on-line clip art library 508 where the user can retrieve clip art images.

As the user submitting the first series of queries 310 (FIG. 3) did in his or her first unsuccessful query 312, the user enters the query "Access point" 510. The user submits the query by manipulating a pointing device (not shown) to direct a cursor 512 to select a search button 514. Unlike the user who entered the unsuccessful query 312 and the other unsuccessful queries 314 and 316 in the first series of queries 310, however, using an implementation of the present disclosure, the associations database will save the user time, effort, and/or frustration and thus improve the user's experience and increase the user's satisfaction with the clip art library. If the clip art library 508 or other resource being accessed charges usage or subscription fees, is supported by advertisements, is a value-added service for customers of the provider of the clip art library 508, or it is otherwise desirable to attract users to the site, user satisfaction is an important consideration.

Figure 6:
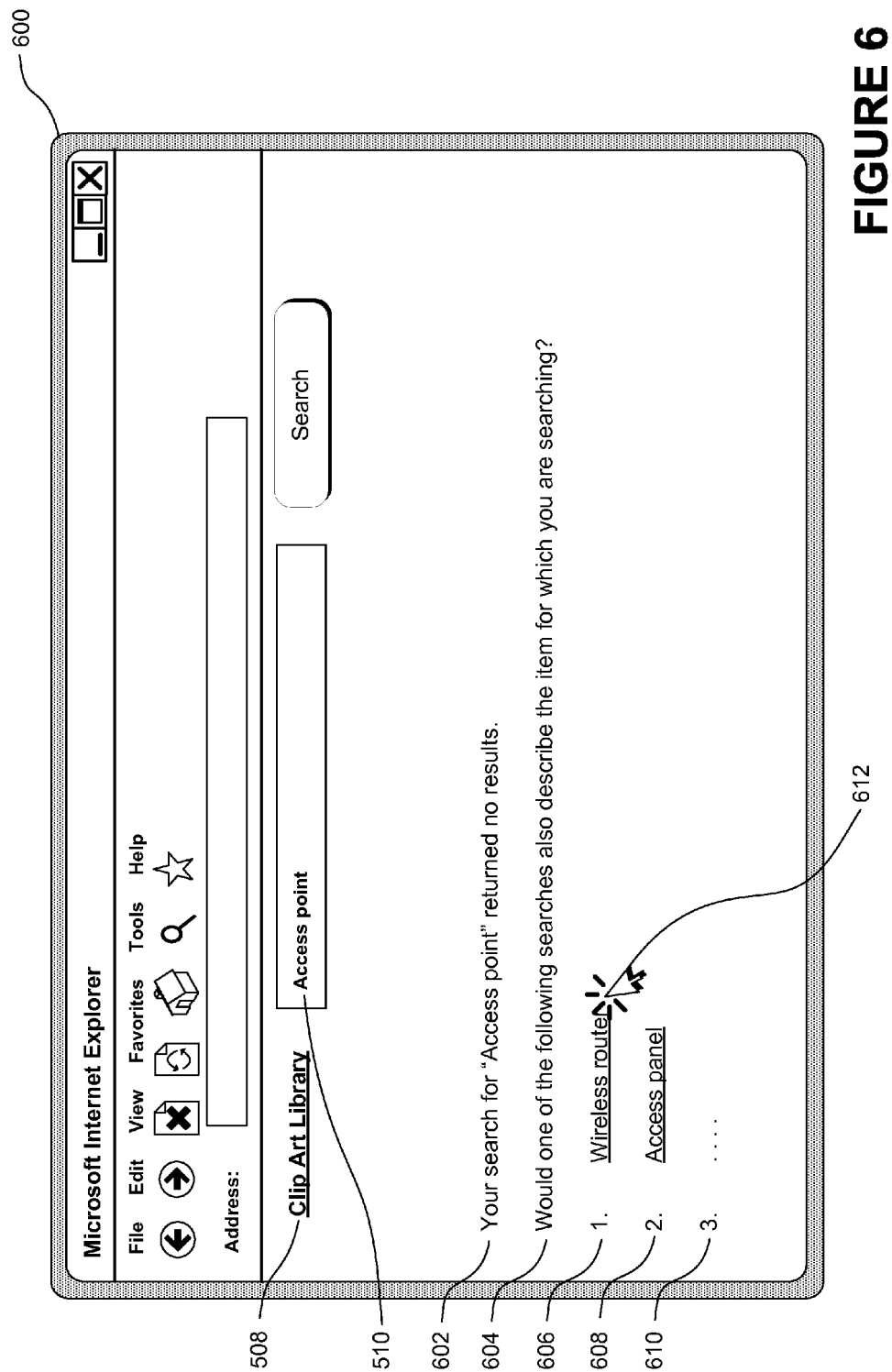

FIG. 6 is a screen view 600 of a response to the query 510 (FIG. 5). Just as in the foregoing example of FIGS. 3-4, the example query for "access point" retrieves no results from the content database represented by the clip art library 508. However, instead of the user being informed the query was unsuccessful and having to formulate and enter another query—or give up—recommended replacement search terms are retrieved from the associations database.

As shown in the screen view 600, a message 602 informs the user that the user's query 510 of the content database for "access point" returned no results. When the current threshold is set to one or more results, the failure to retrieve any results will cause the user's query 510 to be compared with the associations database that includes the plurality of mappings 400 (FIG. 4) developed based on previously-executed queries. Using the mapping 412 from the previously-executed unsuccessful query 312 for "access point," the user is presented with replacement search terms 606 "Wireless router." If a "wireless router" image is what the user was seeking, the user can manipulate a pointing device (not shown) to direct a cursor to select the suggested replacement search terms 606 or otherwise select this recommended query to retrieve the desired results.

Figure 7:
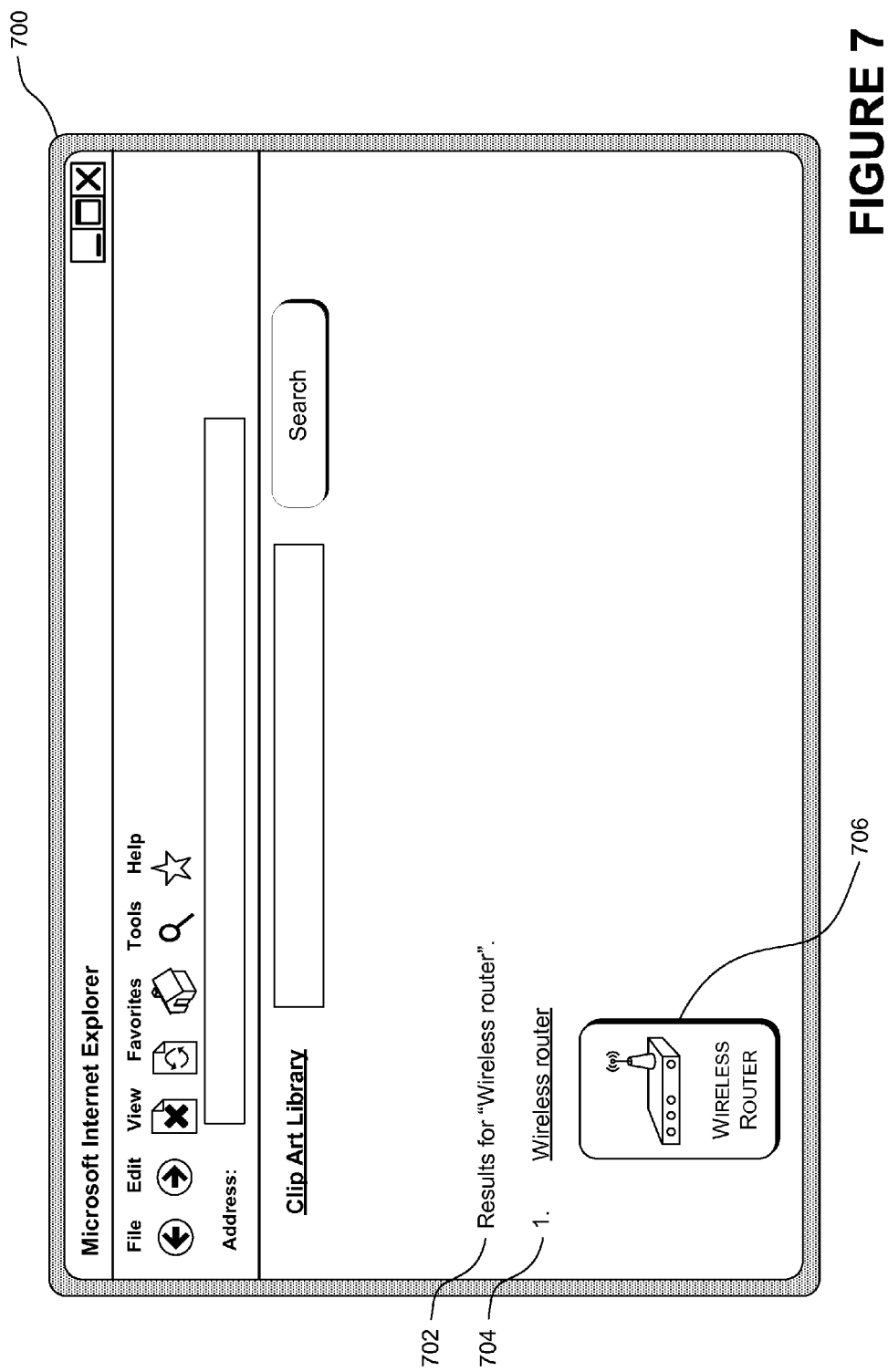

FIG. 7 shows a screen view 700 returning the results from the user's selection in FIG. 6 of the recommended query with replacement search terms. The user is presented with a message 702 informing the user that the recommended query including the replacement search terms "wireless router" has retrieved one or more results. The screen view shows the keywords 704 associated with the retrieved image 706.

Referring again to FIG. 6, it is noted that the first recommend query 606 for "wireless router" was not the only recommended query or replacement search terms retrieved from the associations database. Hypothetically, the content database also may include clip art for an "access panel" that may be included in a wiring diagram or similar graphical design. One or more previously-executed queries or series of queries in which a user submitted the unsuccessful query "access point" eventually may have led to the successful query "access panel." Thus, a second recommended query 608 of "access panel" is presented to the user. A user-entered query may be mapped to more than one association to a successful query. There may be several associations that lead to multiple recommended queries 606, 608, 610, etc. Thus, submitting the query 510 "access point" may retrieve multiple recommended queries of suggested search terms.

Figure 8:
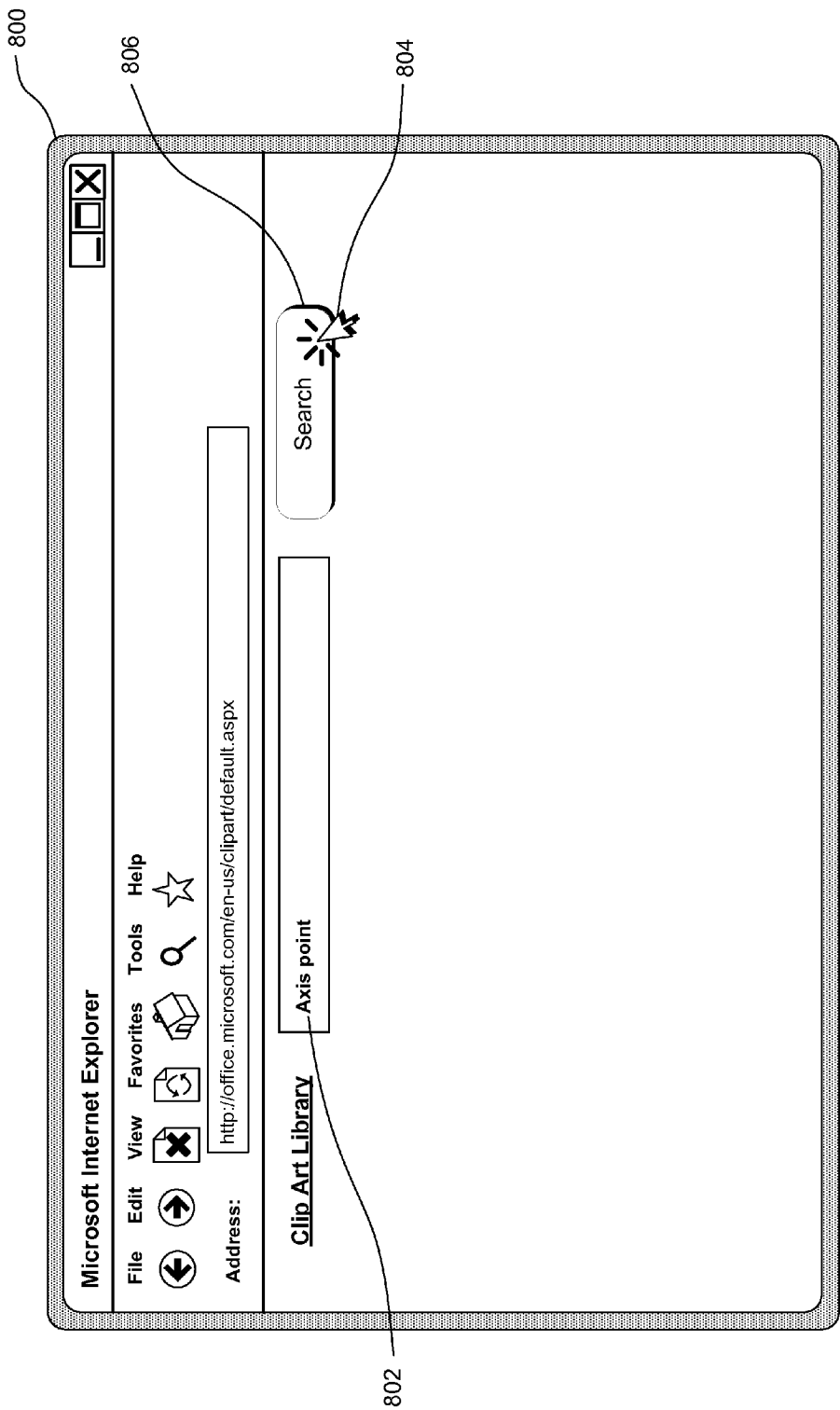
FIGS. 8-9 are screen views of the application of FIGS. 5-7 in which no associations exist for which to recommend replacement search terms.
Figure 9:
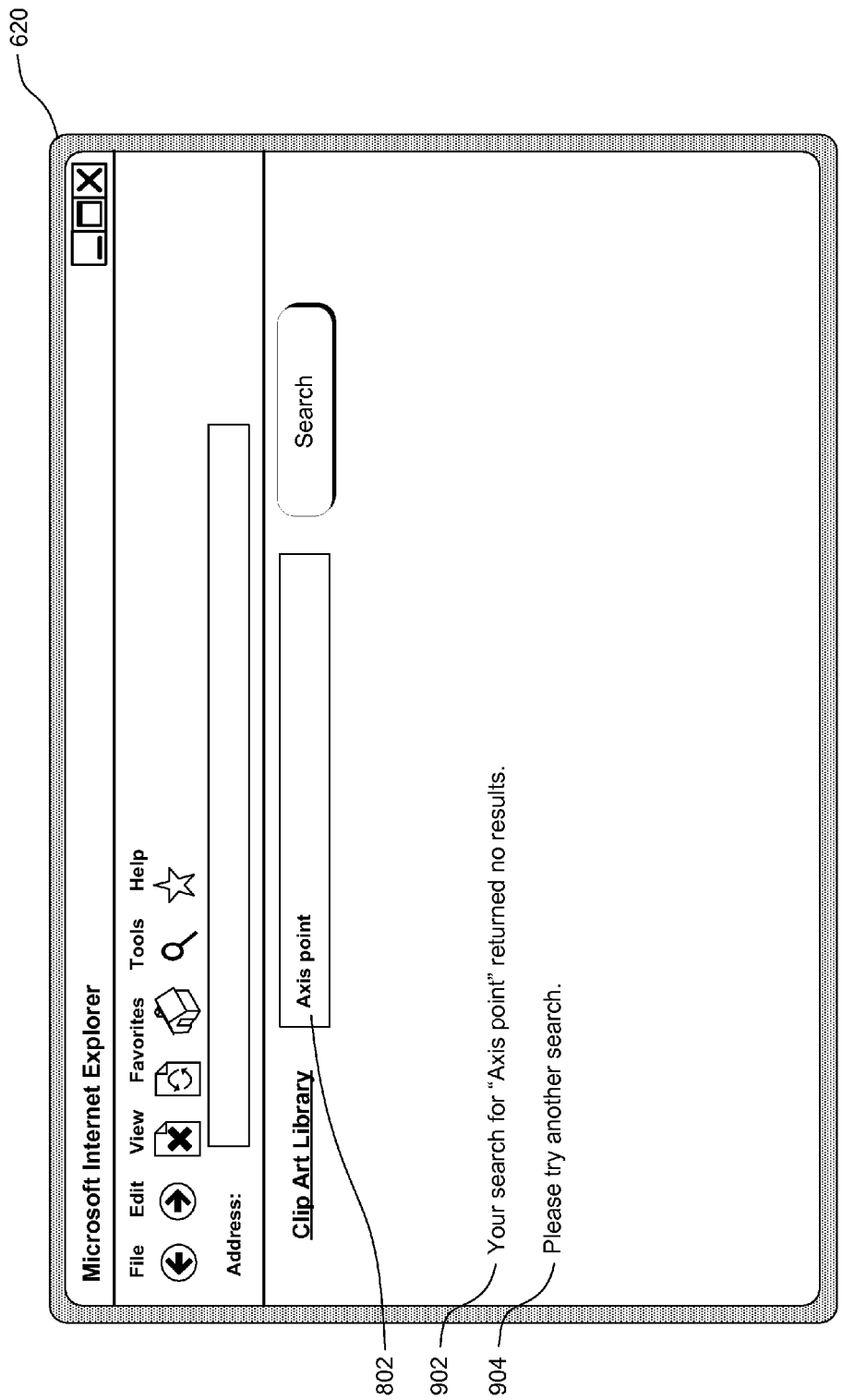

FIGS. 8-9 show an example of an unsuccessful query for which no associations exist. FIG. 8 shows a screen view 800 of a query 802 including the search terms "axis point." In such a query, a user may have inadvertently entered the homonym "axis" instead of the desired term "access" and then directed the cursor 804 to search for an "axis point." However, either because no one or too few people have unsuccessfully searched for an "axis point," the content database includes no recommended queries or replacement search terms for "axis point."

FIG. 9 is a screen view 900 of the results of the unsuccessful query of FIG. 8. As in the screen view 600 (FIG. 6), the user is presented with a message 902 informing the user that the user's query has returned no results. However, because there are not associations for the user's query 802, instead of being presented with recommended queries of replacement search terms, the user is presented with a message 904 asking the user to try another search. Using implementations of the present disclosure, comparing FIGS. 6 and 9 shows that, when a user submits an unsuccessful search, before asking the user to enter a new search, an associations database will be consulted to try to suggest to the user one or more recommended queries and replacement search terms.

Process of Recommending Queries and Developing an Associations Database

Figure 10:
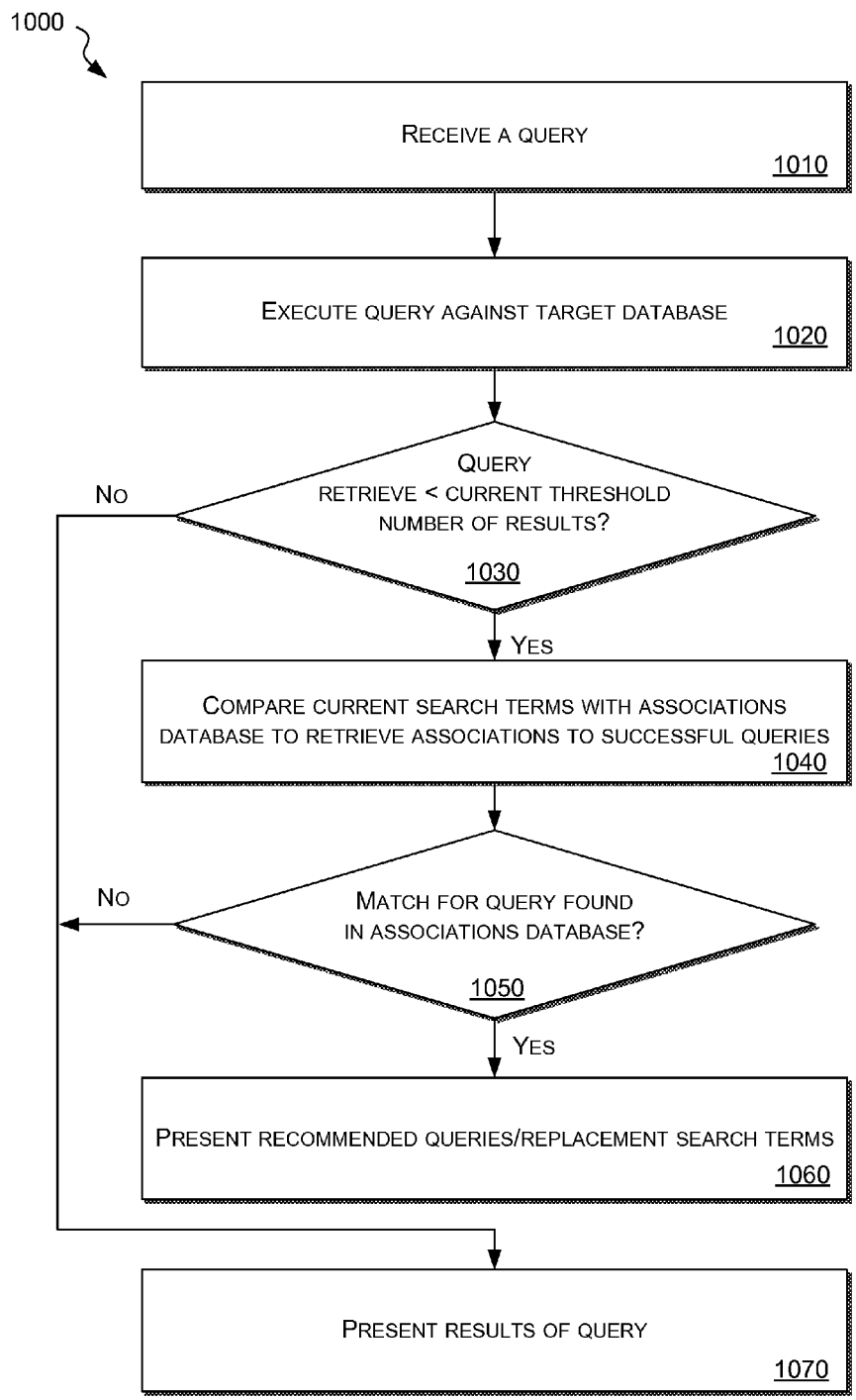
FIG. 10 is a flow diagram of an implementation of the present disclosure to recommend queries and replacement search terms for a query failing to return a current threshold number of results.

FIG. 10 is a flow diagram 1000 of one possible implementation of using and associations database to recommend queries or replacement search terms when a user submits an unsuccessful query.

At 1010, a query is received. At 1020, the query is executed against the target database. The target database may include a content database residing on the users workstation, on the server accessible over a network, or be distributed over a plurality of locations. At 1030, it is determined if the query has retrieved at least a current threshold number of results. As previously described, the current threshold may be set at one or more search results or at another level such that the query retrieving fewer than the current threshold number of results is considered unsuccessful. If it is determined at 1030 that the query has retrieved at least the current threshold number of results, the flow diagram 1000 advances to 1070 to present results of the query.

On the other hand, if it is determined at 1030 the query has retrieved less than the current threshold number of results, at 1040, the current search terms in the query are compared with the associations database to retrieve associations with successful queries. Like the target database being searched, the association's database may reside on a client workstation, on a server accessible over a network, or be distributed among a plurality of locations.

At 1050, it is determined if a match for the query is found in the associations database. If so, at 1060 recommended queries of replacement search terms are presented to the user. However, if it is determined at 1050 that there is no match in the associations database for the query, flow diagram advances to 1070 to present the results of the query which, in this case, will be that there are neither any matching results nor any recommended queries.

Figure 11:
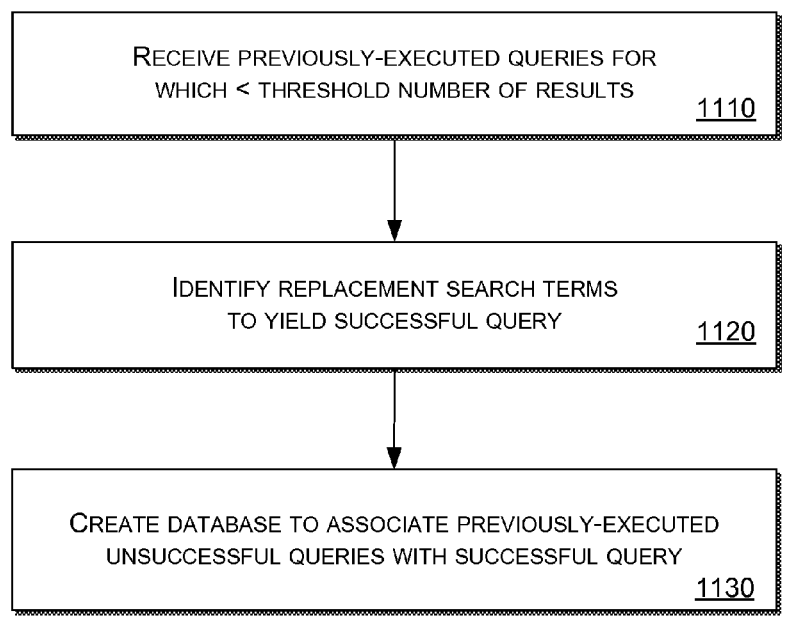
FIG. 11 is a flow diagram of an implementation of the present disclosure to create an associations database from which to recommend replacement search terms.

FIG. 11 is a flow diagram 1100 of one possible embodiment of a process for developing an associations database that can be used to recommend replacement search terms when an unsuccessful search has been presented. At 1100, a plurality of previously-executed queries is received that retrieved less than a threshold number of results from a target database. As previously described, the threshold may be set to any number, such as a higher number or a lower number. As also previously described, the queries may include a series of queries submitted by a user in seeking to retrieve desired results. The previously executed queries that did not yield a threshold number of results may be identified automatically and/or manually.

At 1120, a replacement search terms yielding a successful query are identified. As previously described, search terms yielding a successful query may be identified as including a subsequent query to an unsuccessful query yields at least a threshold number of results. Alternatively, what is considered a successful query may be identified manually and associated with a previously-executed unsuccessful query. In addition, a successful query may be a manually associated query that yields results that one or more previously-executed queries or series of queries failed to retrieve.

At 1130 a database is created to associate the previously executed unsuccessful queries with a successful query. As a result, the database can be searched for such previously-executed unsuccessful queries and, when a match is found, and a successful query (or queries) associated with the previously-executed unsuccessful query can be retrieved.

The above specification, examples and data provide a complete description of the manufacture and use of the composition of the invention. Because many embodiments of the invention can be made without departing from the spirit and scope of the invention, the invention resides in the claims hereinafter appended.

We claim:

1. A computer-implemented method executing on a processor, comprising:
   receiving a query comprising a current search term that is submitted for execution against a target database;
   after receiving the query comprising the current search term that is submitted for execution, executing the query comprising the current search term against the target database;
   displaying results for the current search term when the executing of the query against the target database yields a number of results at least reaching a current search threshold; and
   when the executing of the query yields a number of results that does not at least reach the current search threshold:
      presenting a replacement search term determined from a previous successful query that when previously executed against the target database secured a number of results that at least reached the current search threshold using an associations database;
      receiving a selection of the replacement search term; and
      generating a second query based on the replacement search term;
   wherein the associations database is populated by:
      identifying previously executed unsuccessful queries of the target database for which a number of results secured did not at least reach the current search threshold;
      tracking subsequently entered queries for which a number of results secured reached the current search threshold; and
      mapping search terms included in the previously executed unsuccessful queries to replacement search terms from the subsequently entered queries.

2. The computer-implemented method of claim 1, further comprising presenting an image that is associated with the replacement term.

3. The computer-implemented method of claim 1, further comprising presenting an indication that the query did not return results when the executing of the query yields the number of results less than the current search threshold upon finding a match between the search terms for previously executed unsuccessful queries and the current search term.

4. The computer-implemented method of claim 1, further comprising presenting an indication to try another search as the query did not return results and did not find a match between the search terms for previously executed unsuccessful queries and the current search term.

5. The computer-implemented method of claim 1, wherein the target database identifies images that are associated with search terms.

6. The computer-implemented method of claim 1, wherein the search terms included in the previously executed unsuccessful queries have been manually associated with one or more of the replacement search terms yielding the successful query.

7. The computer-implemented method of claim 6, wherein the search terms manually associated with one or more of the replacement search terms yielding the successful query include search terms included in a series of more than one previously executed unsuccessful query for which the number of results from the executing of the previously executed unsuccessful query is equal to a predetermined number.

8. The computer-implemented method of claim 1 further comprising:
   storing previously executed unsuccessful queries of the target database for which a threshold number of results were not secured for search terms included in the previously executed unsuccessful queries;
   identifying replacement search terms for the search terms in the previously executed unsuccessful queries that led to a successful query yielding the threshold number of results; and
   creating the associations database including associations between the search terms included in the previously executed unsuccessful queries and the replacement search terms such that, upon a query being executed on the target database that fails to return the threshold number of results, the associations are available to present one or more of the replacement search terms to be used in place of the search terms of the query.

9. The computer-implemented method of claim 1, wherein the associations database is edited to delete search terms that are classified as objectionable.

10. A computer-readable storage medium, excluding a signal, storing instructions executable by a computing system to generate a result, comprising:
    receiving a submitted query from a user interface comprising a current search term to be executed against a target database;
    displaying results when executing of the submitted query yields a number of results at least reaching a current search threshold; and
    when executing the submitted query does not yield a number of results at least reaching a current search threshold:
       presenting a replacement search term determined from a previous successful query that when previously executed against the target database secured the number of results that at least reached the current search threshold using an associations database;
       receiving a selection of the replacement search term; and
       generating a second query based on the replacement search term;
    wherein the associations database is populated by:
       identifying previously executed unsuccessful queries of the target database for which a number of results secured did not at least reach the current search threshold;
       tracking subsequently entered queries for which a number of results secured reached the current search threshold; and
       mapping search terms included in the previously executed unsuccessful queries to replacement search terms from the subsequently entered queries.

11. The computer-readable storage medium of claim 10, further comprising presenting an image that is associated with the replacement search term.

12. The computer-readable storage medium of claim 10, further comprising presenting an indication that the query did not return results when the executing of the query yields the number of results less than the current search threshold upon finding a match between the search terms and the current search term.

13. The computer-readable storage medium of claim 10, further comprising presenting an indication to try another search as the query did not return results and did not find a match between the search terms and the current search term.

14. The computer-readable storage medium of claim 10, wherein the search terms included in the previously executed unsuccessful queries have been manually associated with one or more of the replacement search terms yielding the successful query.

15. The computer-readable storage medium of claim 10, further comprising:
storing previously executed unsuccessful queries of the target database for which a threshold number of results were not secured for search terms included in the previously executed unsuccessful queries;
identifying replacement search terms for the search terms in the previously executed unsuccessful queries that led to a successful query yielding the threshold number of results; and
creating an associations database including associations between search terms included in previously executed unsuccessful queries and the replacement search terms such that, upon a query being executed on the target database that fails to return the current search threshold number of results, the associations are available to present one or more of the replacement search terms to be used in place of the search terms.

16. The computer-readable storage medium of claim 15, wherein the associations database is edited to delete search terms that are classified as objectionable.

17. A system, comprising:
a display;
a processor and a computer-readable medium;
the processor configured to perform actions, comprising:
storing previously executed unsuccessful queries of a target database for which a threshold number of results were not secured for search terms included in the previously executed unsuccessful queries;
tracking subsequently entered queries for which the threshold number of results were secured for search terms included in the subsequently entered queries;
identifying replacement search terms for the search terms in the previously executed unsuccessful queries from the search terms in the subsequently entered queries;
mapping search terms included in the previously executed unsuccessful queries to the replacement search terms in an associations database;
receiving a submitted query comprising a current search term to be executed against the target database;
displaying the results on the display when the executing of the query yields a number of results at least reaching the threshold; and
when executing the submitted query does not yield a number of results at least reaching a current search threshold:
presenting, on the display, a particular replacement search term determined from a previous successful query that when previously executed against the target database secured the number of results that at least reached the current search threshold using a mapping in the associations database;
receiving a selection of the particular replacement search term; and
generating a second query based on the particular replacement search term.

18. The system of claim 17, further comprising presenting an image that is associated with the particular replacement term.

19. The system of claim 17, further comprising presenting an indication that the query did not return results when the executing of the query yields the number of results less than the threshold upon finding a match between at least one of the replacement search terms and the current search term.

20. The system of claim 17, further comprising presenting an indication to try another search as the query did not return results and did not find a match between at least one of the replacement search terms and the current search term.

* * * * *